Patented Oct. 4, 1932

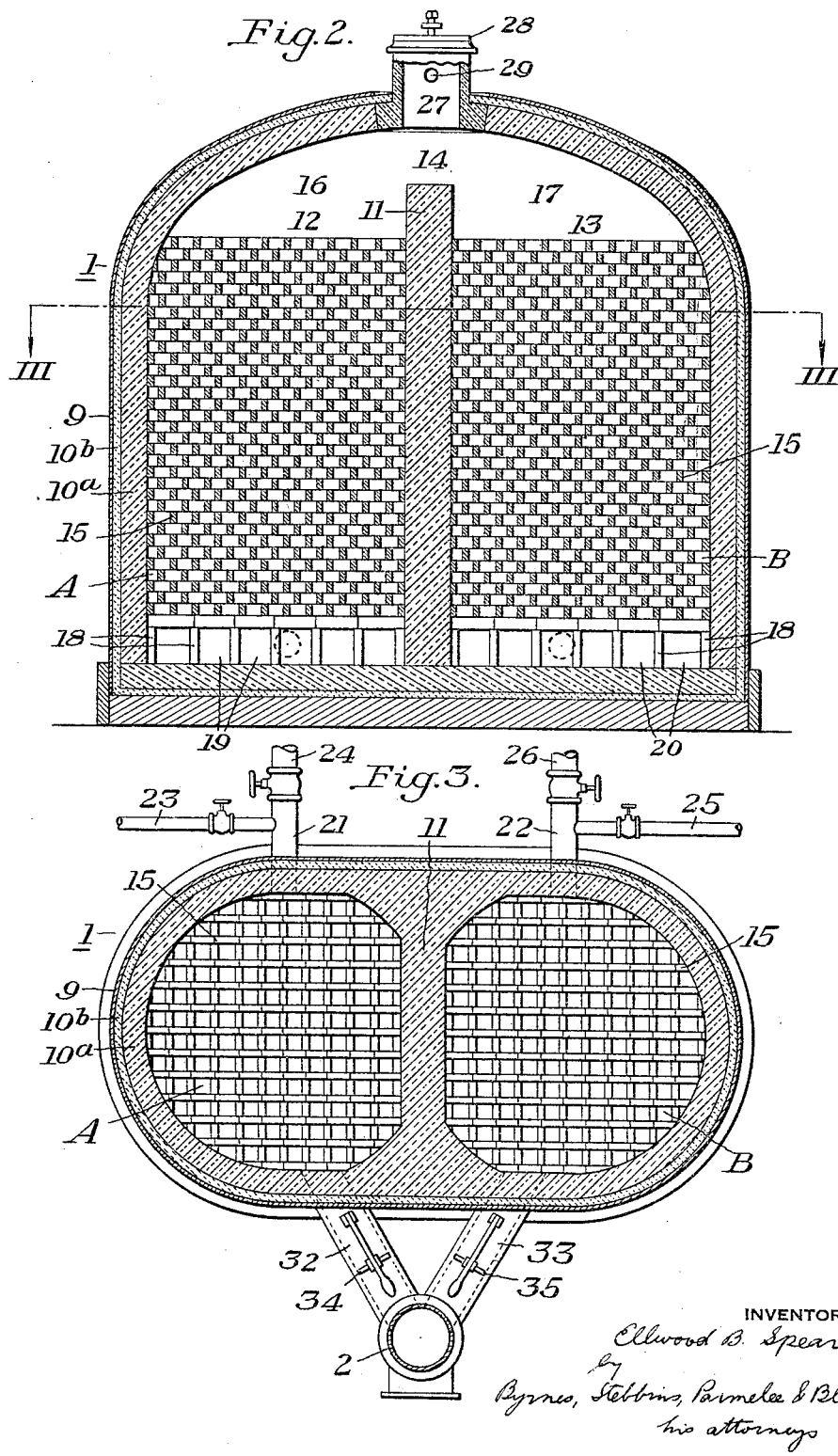

1,880,512

UNITED STATES PATENT OFFICE

ELLWOOD B. SPEAR, OF PITTSBURGH, PENNSYLVANIA, ASSIGNOR TO THERMATOMIC CARBON COMPANY, OF PITTSBURGH, PENNSYLVANIA, A CORPORATION OF DELAWARE

MANUFACTURE OF CARBON BLACK

Application filed August 9, 1929, Serial No. 384,650, and in Canada September 7, 1928.

This application is a continuation in part of my copending applications Serial No. 221,245, filed September 22, 1927, and Serial No. 300,133, filed August 16, 1928.

The present invention relates to the manufacture of carbon black, and more especially to an improved process and apparatus for the manufacture of carbon black, in which the hydrocarbon gas being decomposed is diluted with hot gases of combustion furnished by a burning fuel.

The present invention is an improvement over the process and apparatus developed by the applicant and Robert L. Moore, and described in the Spear and Moore application, Serial No. 61,149, filed October 7, 1925, and continuation applications, Serial No. 206,500, filed July 18, 1927, and Serial No. 300,131, filed August 16, 1928.

According to the preferred procedure in the Spear and Moore process, a substantially inert diluent gas, preferably the residual gas resulting from the previous decomposition of a quantity of hydrocarbon gas and consisting principally of hydrogen, is preheated above the decomposition temperature of the hydrocarbon gas. The hydrocarbon gas to be decomposed is then mixed with the diluent gas.

The volume of the diluent gas is considerably greater than that of the hydrocarbon gas in the mixture, the volume of the diluent gas being at least two or three times that of the hydrocarbon gas. The mixture of the preheated diluent gas and the hydrocarbon gas is passed over extensive heat exchanging surfaces to decompose the hydrocarbon gas and yield solid carbon particles. Part of the carbon thus formed is deposited upon the heat exchanging surfaces and part is entrained in and swept along with the gas, which is then passed through devices for quickly cooling it and separating the carbon from the gas.

In the Brownlee and Uhlinger Patent No. 1,520,115 of December 23, 1924, is described another process of thermal decomposition of a hydrocarbon gas to produce carbon black. The characteristics of the carbon black produced by the Brownlee and Uhlinger process, particularly its characteristics in rubber compounding, are described in the patent of Roy E. Uhlinger, No. 1,638,421, of August 9, 1927. In the said Uhlinger patent, the characteristics of commercial carbon black and the carbon black as made commercially by the Brownlee and Uhlinger process are stated in detail and need not be repeated here.

The Spear and Moore process above referred to differs from the Brownlee and Uhlinger process, among other particulars, in that the hydrocarbon gas to be decomposed is mixed with a considerably greater volume of diluent gas, preferably an inert gas preheated before being mixed with hydrocarbon gas.

As described in the Spear and Moore applications above referred to, the dilution of the hydrocarbon gas with the diluent gas profoundly modifies the characteristics of the carbon black from carbon black as produced by the Brownlee and Uhlinger process, in which the hydrocarbon gas is decomposed without dilution. The carbon produced by the Spear and Moore process differs from both the common commercial carbon black and the Brownlee and Uhlinger carbon black. By common commercial carbon black, I mean the usual carbon blacks of commerce which are ordinarily made by gas flames burning against relatively cool metal surfaces upon which the carbon black is deposited and from which it is scraped. This process is ordinarily called the channel process and these blacks are sometimes known as channel blacks. The carbon as described in the Brownlee and Uhlinger patent is produced by the decomposition in a heated retort of a hydrocarbon gas without substantial combustion of the gas. The carbon black made by the Spear and Moore process has certain of the desirable qualities of both the common commercial carbon blacks and the Brownlee and Uhlinger carbon black. Generally speaking, the Spear and Moore carbon black has the low rubber-stiffening qualities of the Brownlee and Uhlinger carbon black, but has a darker color. It imparts an ultimate tensile strength to cured rubber compositions approximately equal to that imparted by an equal weight of the best grades of common commercial carbon black. It imparts to the cured rubber a greater elongation at the point of rupture than that imparted by equal weights of either common commercial carbon black or the Brownlee and Uhlinger carbon black.

A considerably greater proportion by weight of the Spear and Moore carbon black may be milled in the rubber than of the common commercial carbon blacks. A somewhat greater proportion by weight of the Spear and Moore carbon black may be milled into the rubber and the desirable qualities of the rubber composition retained, than is the case with the Brownlee and Uhlinger carbon black.

My process, as hereinafter more fully described, resembles the Spear and Moore process in the decomposition of the hydrocarbon gas by passing it, together with the preheated diluent gas, over extensive heat exchanging surfaces, as contrasted with the channel process in which the gases are burned. The carbon black as commercially produced by my process is intermediate in quality between that of the Brownlee and Uhlinger process and that of the Spear and Moore process, but has characteristics approaching the carbon black as produced by the Spear and Moore process.

My process is in the nature of a variation from and an improvement upon the Spear and Moore process for the cheaper production of a carbon black having the characteristics of the same general type and approaching those of the carbon black produced by the Spear and Moore process. In order to carry out my improved process, I employ an apparatus differing in a number of important particulars from that described in the Spear and Moore process.

In the Spear and Moore process as described in the Spear and Moore application, the hydrocarbon gas is decomposed in a heated retort of the general type shown in the Brownlee and Uhlinger patent. The Spear and Moore retort contains refractory checkerwork, but differs from the checkerwork arrangement shown in the Brownlee and Uhlinger patent in that the checkerwork is divided into two zones, one above the other, between which is a mixing chamber.

In the Spear and Moore process, the checkerwork is highly heated by a heating blast substantially as described in the Brownlee and Uhlinger patent. After the heating blast is cut off, a diluent gas, which is preferably the hydrogen-containing residual gas resulting from the previous decomposition of a quantity of the hydrocarbon gas used, usually natural gas, is introduced into the top of the retort and flows down through the upper or first zone of the heated checkerwork, in which it is preheated well above the decomposition temperature of the hydrocarbon gas to be decomposed. The preheated diluent gas and the hydrocarbon gas to be decomposed are mixed in the chamber between the upper and lower zones of checkerwork, and the mixture passes down through the lower zone of checkerwork in which the hydrocarbon gas is decomposed to yield solid carbon particles. Part of the carbon particles are deposited on the checkerwork and part are swept along with the stream of gas and out of the retort and through gas-cooling and carbon-collecting devices similar to those shown in the Brownlee and Uhlinger patent. The carbon particles which are deposited or encrusted on the checkerwork are burned off by the application of the heating blast used for heating the checkerwork.

As described in the Spear and Moore applications, the diluent gas, which is preferably the residual gas from which the carbon has been separated, is piped back and introduced into the retort in a relatively cool condition so that a relatively large volume of checkerwork, which has to periodically heated with a heating blast, must be employed to preheat the diluent gas in the retort before it is mixed with the hydrocarbon gas.

Since, as described in the Spear and Moore application, the diluent gas should be mixed with the hydrocarbon gas in a considerably larger volume than that of the hydrocarbon gas, relatively large volumes of the diluent gas must be handled and heated, necessitating a considerable expense in the gas handling and heating apparatus. In my process, I use the hot combustion gases from a burning fuel while still retaining their sensible heat, as the preheated diluent gas to be mixed with the hydrocarbon gas. The combustion gases are preferably formed in a chamber forming part of the retort, or adjacent to the chamber in which decomposition takes place, so that the combustion gases may be passed directly and without material loss of heat into the decomposition chamber. I thus do away with the handling and reheating of the diluent gas as described in the Spear and Moore application. The apparatus which I use is considerably less expensive to build for handling the same volume of hydrocarbon gas than is the apparatus shown in the Spear and Moore application.

I will now describe in detail my process and apparatus. In the drawings:—

Figure 2 is a vertical section through the heating retort along the line II—II of Figure 1; and Figure 3 is a horizontal section along the line III—III of Figure 2.

Figure 1:
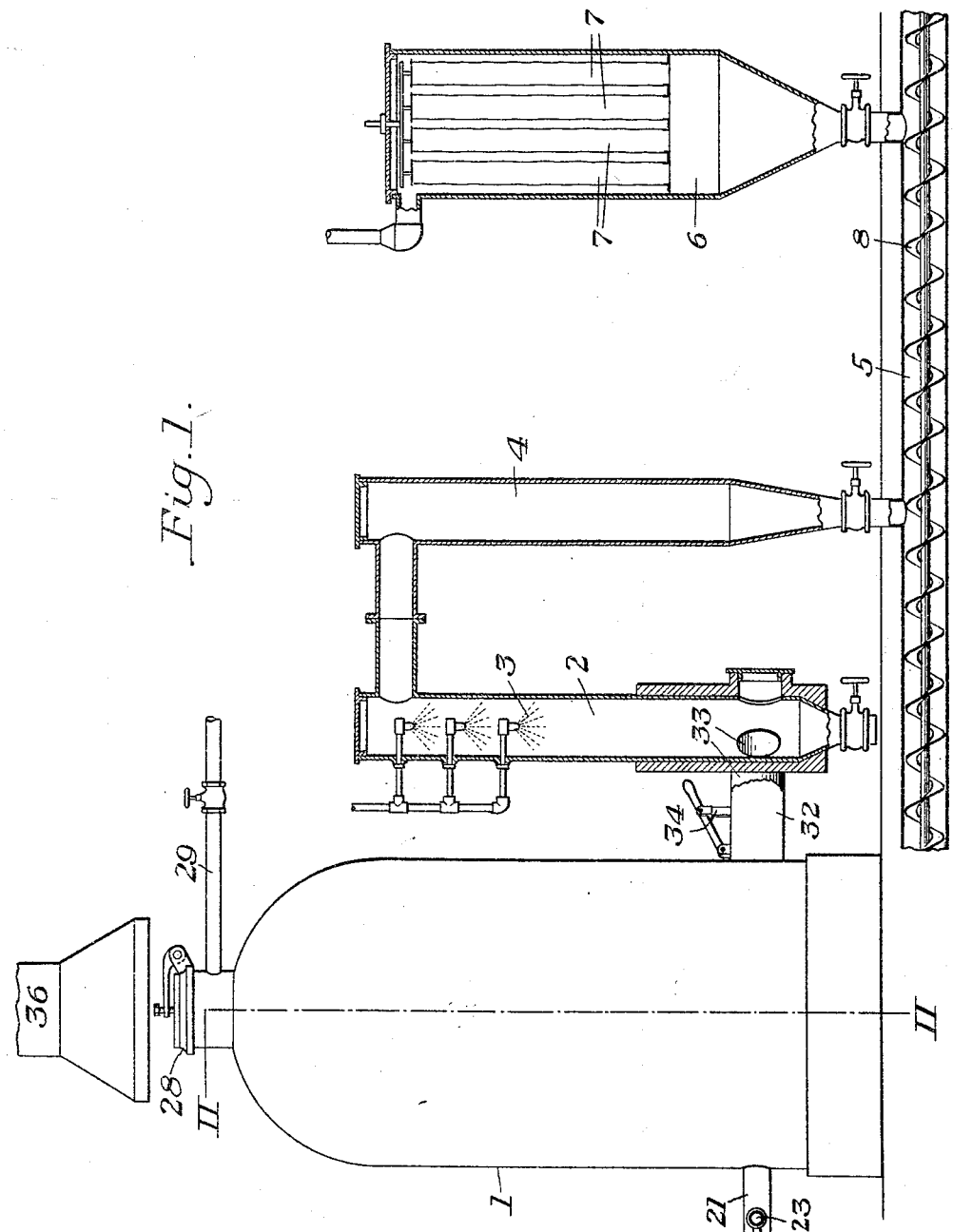
Figure 1 is an elevation taken partly in vertical section showing more or less diagrammatically the preferred apparatus for carrying out the process.

The preferred apparatus as shown is of the general type shown in the Brownlee and Uhlinger Patent No. 1,520,115. Generally speaking, it consists of a retort containing checker-work which is highly heated and through which the gas is passed to decompose the hydrocarbon.

Referring to the illustrated embodiment of the apparatus, and particularly to Figure 1, reference numeral 1 indicates the retort in which the decomposition of the hydrocarbon gas takes place. The effluent gas which issues from the retort and which contains the entrained carbon particles passes to a chamber 2 in which a water spray 3 is discharged to cool the gas. The hot gas converts the water into steam, the latent heat of evaporation serving efficiently to cool the gas. The gas then passes downwardly through a column 4 and along a conveyor passage 5 into the chamber 6, where the gas passes through the fabric bags 7 which are shaken from time to time to dislodge the carbon. The carbon from the separator 6 and the tower 4 falls into the conveyor passage 5, where it is pushed along to the right as viewed in Figure 1, by means of the screw conveyor 8, into a bin from which it is bagged. The general layout above described, and particularly the means for cooling and collecting the carbon black, is similar to that described in the Brownlee and Uhlinger Patent No. 1,520,115. The temperature of the cooling chamber 2 is preferably automatically thermostatically controlled, as described in the Brownlee and Uhlinger patent.

The retort 1, its novel construction and the reactions taking place therein are now described in more detail.

The retort 1 has a steel plate casing 9 and a lining consisting of a facing $10^a$ of firebrick and a backing $10^b$ of refractory insulation material, such as asbestos or the porous insulating material sold under the trade-mark "Silocel". The retort is divided by a firebrick wall 11, into two chambers 12 and 13, which are duplicates of each other. A free passage between the chambers is provided by the opening 14 over the top of the partition wall 11. Each chamber contains refractory checkerwork 15, preferably built of silica brick, forming the two checkerwork reaction zones designated as A and B, respectively, in the chambers 12 and 13, respectively. There are mixing spaces or free chambers 16 and 17 at the tops of the chambers 12 and 13, respectively. The checkerwork is supported by supporting columns or upright bricks 18, forming relatively open spaces or chambers 19 and 20 beneath the checkerwork in the chambers 12 and 13, respectively.

While in the illustrated embodiment of the invention, the two chambers 12 and 13 are formed within the confines of the single outer casing, the chambers might be otherwise arranged, as, for instance, each chamber might be built within its own casing and the chambers connected by a connecting passage or pipe.

Inlet pipes 21 and 22 discharge into the chambers 19 and 20, respectively. Inlet pipe 21 has two branches 23 and 24 carrying the fuel gas, usually natural gas, and air, respectively. The inlet pipe 22 has similar gas and air branch pipes 25 and 26. By admitting fuel gas and air through the respective branch pipes, a heating blast can be discharged into either chamber 19 or 20. The top or dome of the retort is provided with an opening or passage 27, which is normally closed by a cap valve 28. A pipe 29 discharges into the top of the retort for introducing the hydrocarbon gas to be decomposed, which is commonly known as the "run gas" in this industry.

The bottoms of the chambers 12 and 13 are connected to the spray tower 2 by discharge pipes 32 and 33, respectively, which are provided with shut-off valves 34 and 35.

The preferred operation of the apparatus is as follows: The checkerwork in both chambers is initially heated by heating blasts through the blast inlets 21 and 22. During this preliminary heating, which occurs when a cold retort is to be brought into operation, the gases of combustion pass up through the checkerwork zones A and B to initially heat them. The combustion gases are allowed to escape through the opened cap valve 28 in the top of the retort into the stack 36, through the roof of the building.

If it is desired to interrupt the regular operation of the retort at any time, the retort may be kept in a hot or "stand by" condition by a suitable amount of heat supplied by the blasts through the pipes 21 and 22, the products of combustion being allowed to escape from the top of the retort.

After a cold retort has been heated up, it is in condition to perform its regular reversing cycle for the production of carbon black. To do this, the heating blast is supplied through one or the other of the blast pipes 21 or 22, say, for example, the pipe 21, into the chamber 19. The air and fuel gas admitted through the gas pipe 21 burn in the chamber 19 and up through the checkerwork 15. The proportion of air admitted through the branch pipe 24 and the fuel gas admitted through the branch pipe 23 may be adjusted so that the products of combustion as they emerge from the top of the checkerwork are principally or all carbon dioxide, or principally carbon monoxide, or a mixture of carbon dioxide and carbon monoxide, together, of course, with the nitrogen derived from the air and water vapor from the oxidation of the hydrogen constituent of the hydrocarbon gas. The effect of the different proportions of the carbon dioxide and carbon monoxide is discussed in detail later.

The highly heated gases of combustion, which serve as the diluent gas during the decomposition of the hydrocarbon or run gas, pass over the top of the baffle wall 14, from the chamber 16 into the chamber 17. The run gas, which is usually natural gas, is admitted through the pipe 29 into the top of the retort and mixes with the stream of diluent gas passing into the mixing chamber 17, above the checkerwork zone B. This mixture of diluent gas and run gas passes down through the checkerwork zone B, which has been highly heated by the blast previously applied to it.

The run gas is decomposed into solid carbon particles and hydrogen. The hydrogen is swept along with the stream of gases and out of the retort. The recoverable carbon is entrained in the gas stream and is recovered in the filtration apparatus.

When the combustion is regulated to produce but little carbon dioxide in the diluent gas, solid carbon is deposited and encrusted on the checkerwork brick of the zone B. When the combustion is regulated to produce principally carbon dioxide in the diluent gas, little if any carbon is deposited or encrusted on the checkerboard. The entrained and recoverable carbon is produced when the combustion is regulated for either carbon monoxide or carbon dioxide in the diluent gas or a mixture of the two.

The carbon particles which are entrained in the stream of gas are swept along through the checkerwork into the chamber 18 and through the discharge pipe 33 into the cooling column 2, and through the carbon collector 6, where the carbon is filtered from the gas and recovered.

During this part of the cycle, the gate valve 35 in the discharge pipe 33 is, of course, open and the gate valve 34 and the discharge pipe 32 is closed. The valves admitting air and fuel gas to the blast pipe 22 are also closed. That portion of the cycle using the checkerwork zone B as the decomposition zone is continued until the checkerwork in the zone B has dropped in temperature or has become encrusted with carbon, so that it does not act efficiently as a decomposing zone. This time may vary from five to fifteen minutes, depending upon the size of the furnace, the relative proportions of carbon monoxide or carbon dioxide in the diluent gas, the dilution ratio, etc. The usual time in commercial operation is from five to seven minutes.

The length of time between reversals must be determined for each particular type of furnace and for the particular run and diluent gases used and for the particular ratio of diluent gas to the run gas. The length of time for reversals can readily be determined by watching the carbon black production and regulating the reversals to get the maximum carbon black production.

After that portion of the cycle has been completed during which the zone B is used as the reaction zone, the run gas is cut off from the pipe 29, the blast is cut off from the blast pipe 21, the shut-off valve 35 in the discharge pipe 33 is closed, and the shut-off valve 34 in the discharge pipe 32 is opened. The valves 25 and 26 are then opened to admit the heating blast through the blast pipe 22, and the run gas is again admitted through the pipe 29.

The operation is then repeated with the chambers 12 and 13 in reversed operation. The blast from the pipe 22 reheats the checkerwork in the zone B and burns off encrusted carbon, if present, from the checkerwork. The hot gases of combustion pass over into the chamber 16, where they mix with the run gas, and the mixture of diluent gas and run gas then passes down through the checkerwork zone A, where decomposition takes place. The gases then pass from the chamber 19 through the discharge pipe 32 into the gas-cooling and carbon-collecting devices. This completes the portion of the carbon-black-producing cycle in which the checkerwork zone A is used as the reaction zone. The carbon-producing cycle is thus divided into two half cycles, the first, in which the checkerwork B is used as the reaction zone, and the second, in which the checkerwork A is used as the reaction zone.

At the end of these two half cycles of the carbon-producing cycle, the temperature of the checkerwork zones A and B will usually have dropped sufficiently so that they will no longer operate efficiently to decompose the mixture of run gas and diluent gas. In commercial operation, the checkerwork zones have their temperatures boosted by applying a heating blast through the burner pipes 21 and 22. In commercial operation, this heating period usually occupies about five to seven minutes. After the temperatures in the checkerwork zones A and B have been thus boosted, the carbon production is then continued, first using the zone B as the reaction zone, reversing and then using the zone A as the reaction zone, followed by a further heating period. When the furnace is thus operated, the cycle has three periods, first, the half cycle in the carbon-producing operation in which the zone B is used as the reaction zone; second, the other half cycle of the carbon-producing operation in which the zone A is used as the reaction zone; and third, the portion or period of the complete three-part cycle in which the temperatures of the reaction zones A and B are boosted preparatory to a repetition of the carbon-producing cycle. In commercial operation, and particularly when using a dilution ratio of three volumes of diluent gas to one of run gas, the three-part cycle is usually employed. However, the furnace may be operated upon a two-part cycle consisting of first using the zone B as the reaction zone, followed by using the zone A as the reaction zone, and then reversing and repeating these two half cycles, without intermediate boosting of the reaction zone temperatures. This may occur if a large ratio of the hot diluent gas to the run gas is employed, since the larger dilution ratio will furnish more heat to the mixture which is to be decomposed, with a consequent less tendency to cool the checkerwork in the decomposing zone.

When a hydrocarbon gas, such as methane or natural gas, is heated, the hydrocarbon breaks down, yielding solid carbon particles and hydrogen. This reaction is endothermic. The temperature at which this reaction takes place, as well as the speed of the reaction, is profoundly affected by the presence of heat exchanging surfaces. If heat exchanging surfaces are present, the decomposition takes place at a lower temperature and much more rapidly than would be the case if the gas were heated in a container which did not contain extensive contact surfaces. For this reason, the reaction zones are formed with extensive contact surfaces which are heated.

The heat exchanging surfaces are preferably provided, as shown, by refractory checkerwork built up of refractory brick, although the surfaces may be otherwise provided. The word "checkerwork" is intended as a term of general description and not of limitation, and is intended to include other materials and different shapes, whether in the form of regular brick or irregularly shaped bodies, so placed in the retort chamber as to expose extensive surfaces with free passages between them to permit flow of gas. When I speak of extensive contact surfaces I mean that the surfaces shall be of sufficient area so as to cause the decomposition of the hydrocarbon gas to take place as herein described, and to thereby distinguish my construction from a chamber in which the only surfaces presented are those of the walls, and which are so small as to have but little surface effect upon the decomposition of the gas. I use the word "checkerwork" to distinguish my construction, on the one hand, from an open chamber in which the only surface presented is that of the walls which is so small as to have but little surface effect upon decomposition of the gas; and, on the other hand, from a bed of granular material in which the pieces of material and the passage between them are so small that the carbon would be practically all caught in the bed of material and could not be recovered.

Other specific forms of extensive heated contact surfaces may be provided in whole or in part by a heat-resisting metal structure, although I prefer to use refractory bricks such as silica or silicon carbide brick, in a retort like that illustrated, in which the heating blast is periodically applied through the reaction zone.

For the purpose of giving a better insight into the reactions and conditions surrounding them, I will now attempt to set forth what I believe to be the underlying theoretical reasons. I believe such theory to be correct, but it is to be understood that it is a matter of theory and that I do not intend to limit my invention to the theory, since, as a matter of practice, efficient carbon production has been attained with the use of the method and apparatus herein described.

When the run gas or hydrocarbon gas to be decomposed, which we will assume for simplicity is natural gas which consists almost entirely of methane, is introduced through the pipe 29 into the stream of hot combustion gases passing over the top of the baffle wall 14, some reaction between the diluent gas and the hydrocarbon gas probably starts immediately. The reactions which take place at this point are extremely complicated and so far as I know, have never been fully explained. These reactions are of relatively minor influences at the operating temperatures in my retort, because the gaseous mixture immediately enters the top of the refractory checkerwork, say for example, the checkerwork B.

The temperatures of the checkerwork zones average about 2200 to 2600° F., preferably about 2400 to 2500° F. at the bottom, and about 1500 to 2000° F., preferably about 1700 to 1800° F. at the top. The bottoms of the checkerwork zones are somewhat hotter than the tops, due to the fact that the heating blasts are applied at the bottoms. The temperature of the diluent gases as they pass from the top of the checkerwork is about that of the top of the checkerwork, say from 1500 to 2000° F., and preferably from 1700 to 1800° F. The addition of the run gas to the diluent gas coming from the checkerwork lowers the temperature of the diluent gases.

This reduction in temperature depends upon the dilution ratio. Assuming a dilution ratio of one part of run gas at room temperature to three parts of diluent gas at a temperature of 1800° F., a calculation based upon the cooling effect of this volume of run gas upon the diluent gas indicates that the temperature of the mixture will be in the neighborhood of about 1370° F., neglecting any endothermic effect which may occur, due to a decomposition of the run gas which would still further lower the temperature.

At temperatures which are practically obtainable for the mixture, the rate of decomposition of the run gas, without the use of heat exchanging surfaces, would be entirely too slow for practical operation. Because of the money invested, the decomposing retorts must be worked at a fairly high capacity, and therefore, the stream of gas must flow fairly rapidly through any commercial gas decomposing retort. Moreover, if the carbon once formed remains in the heated retort too long, it tends to become coarse or graphitic in texture and gray in color. It is therefore desirable, both for economy in operation and for attaining the desired product, to speed up the decomposing reaction by the use of extensive heat exchanging surfaces.

These heat exchanging surfaces have the dual function of bringing up the mixture formed by the preheated diluent gas and the cold run gas to the proper operating temperature and of exerting the so-called catalytic or surface action in speeding up the decomposing reaction at the operating temperature.

The diluent gas is used in an excess by volume over that of the run gas, the volumes being computed at the same temperature. For the production of a carbon having fine particles and a very dark color, the volume of diluent gas should be at least twice that of the run gas, and preferably three or four times that of the run gas.

As described in the Spear and Moore application, the presence of the relatively large amount of diluent gas in the mixture profoundly modifies the carbon from that produced by the Brownlee and Uhlinger process, or that which would be produced by a process in which a relatively small amount of diluent gas might be used. When a hydrocarbon gas, such as natural gas, is decomposed in the retort, as in the Brownlee and Uhlinger process, a carbon black is produced which is of a grayish cast and which contains a larger proportion of large carbon particles than the carbon black produced when a considerable volume of diluent gas is employed. The same would be true if a relatively small amount of a diluent gas were present in the hydrocarbon gas. These large carbon particles produced by the Brownlee and Uhlinger process apparently persist as such even when the carbon is milled into rubber or other media. The carbon particles as initially formed at the contact surfaces in the Brownlee and Uhlinger process are in an environment which is rich in hydrocarbon, and they apparently serve as decomposition centers or nucleii which grow in size, due to the further decomposition of the hydrocarbon gas.

When the hydrocarbon or run gas is sufficiently diluted, as in my process, the carbon particles as initially formed upon or in the neighborhood of the contact surfaces are in an environment in which the molecules of the hydrocarbon gas are dispersed in the diluent, so that the hydrocarbon molecules do not have the same opportunity to grow in size. Moreover, the relatively large volume of the added diluent speeds up the velocity of the gas stream through the reaction zone and more quickly removes the carbon particles which are not allowed to remain in the highly heated zone for but a few seconds. This shortening of the time that the carbon particles can remain in the reaction zone, also tends to preserve the dark color and fineness of the carbon particles.

The character of the resultant carbon is therefore dependent upon the relative volumes of the diluent and run gases. If the ratio of diluent to run gas be decreased much below about two to one, say one to one, the carbon has characteristics which approach those of the carbon black produced by the Brownlee and Uhlinger process, in which no diluent gas is used, namely, it would be of a grayish cast and of a higher apparent gravity or lower bulking value and would contain a larger proportion of large particles than where a sufficient volume of diluent gas is employed. At the two to one ratio of diluent to run gas, the desirable qualities imparted to the carbon by the use of the diluent gas are well developed. Tests have indicated that these desirable qualities are fully attained at the ratio of about three volumes of diluent gas to one of run gas.

There is therefore no advantage in increasing this ratio beyond the point at which the desirable characteristics are fully developed by dilution, as an increase of the diluent gas merely means more gas handled and also, as will be further explained, when the diluent gas contains principally carbon dioxide, a decrease in yield of recoverable carbon black. Therefore, I prefer to use a dilution ratio of not over about six volumes of diluent gas to one volume of run gas, although such ratio may be exceeded, particularly when using principally carbon monoxide in the diluent gas. In commercial operation a dilution ratio of three or four to one, usually about three to one, has been found to be satisfactory.

In order to explain the reactions which may take place, we will consider two cases, first, where the combustion of the heating blast is regulated to produce principally carbon monoxide, and second, where it is regulated to produce carbon dioxide entirely or principally. The combustion gases, of course, contain nitrogen and steam or hydrogen, in addition to the carbon dioxide or carbon monoxide. Therefore, when I speak of producing principally carbon monoxide, I mean that the oxidized carbon in the gas exists principally as carbon monoxide and not as dioxide, and conversely, when I speak of producing carbon dioxide entirely or principally, I mean that the carbon dioxide is produced to the exclusion of carbon monoxide or that the gases contain carbon dioxide with but little carbon monoxide.

Referring first to the carbon monoxide case: The ratio of air to fuel gas admitted to the heating blast may be adjusted so that the resultant products of combustion discharged at the top of the checkerwork which is being blasted will contain principally carbon monoxide with but relatively little carbon dioxide.

When a natural gas consisting of about 91% methane 6.5% nitrogen and 2.5% ethane, such as that from the "dry" section of the Monroe gas field in Louisiana, is used as the heating gas, a ratio of air to gas of about four to one is found by practice to yield carbon monoxide with but 1% or so of carbon dioxide in the resultant products of combustion. The products of combustion as they emerge from the top of the checkerwork will at this air and gas ratio contain some free carbon. They also contain nitrogen which was present in the air. The hydrogen constituent of natural gas appears either as steam or hydrogen.

The highly heated water vapor or superheated steam which results from the oxidation of the hydrogen constituent of the natural gas has been generally regarded as an oxidizing gas at high temperatures. I have found, however, that the presence of the steam is not objectionable from this standpoint as it is apparently substantially inert to the solid carbon particles entrained in the gases of decomposition in the reaction zone, under the conditions maintained. So far as I can determine, the steam at the concentration found in the combustion gases does not cause any objectionable or material decrease of the carbon black produced. The carbon monoxide is, of course, inert to the carbon and the run gas. By the term "inert", I mean that it does not combine to any substantial extent, as by oxidation.

Decomposition of the run gas into solid carbon and hydrogen apparently takes place at or in the immediate vicinity of the heat exchanging surfaces furnished by the checkerwork. Rather more than half of the solid carbon is deposited on the checkerwork surfaces and the remainder is swept along with the stream of effluent gas and is recovered in the filtration apparatus.

When the carbon monoxide greatly predominates over carbon dioxide in the combustion gases, the carbon which is deposited in the checkerwork during the half cycle in which the checkerwork is acting as the reaction zone, is removed during the next half cycle when the blast is applied to such checkerwork. Therefore, when the heating blast is applied, it should contain sufficient excess air to burn off this encrusted carbon to carbon monoxide.

Carbon dioxide and solid carbon tend to combine at high temperatures to form carbon monoxide. The checkerwork is encrusted with carbon. Therefore, carbon dioxide, which may be formed by a lean mixture in the open chambers 19 and 20, beneath the checkerwork, will tend to be reduced to carbon monoxide as it passes up through the carbon-encrusted checkerwork. In adjusting the air and gas ratio to produce carbon monoxide, the effect of the encrusted carbon has to be taken into account.

In the natural gas field, where gas is cheap enough to use for making carbon black, the natural gas is the most satisfactory and the cheapest fuel for supplying the hot diluent gases of combustion. The temperature obtainable in burning natural gas to carbon monoxide is insufficient to decompose the run gas mixed with it to yield any substantial quantity of solid carbon, without the aid of contact surfaces. As above explained, the contact surfaces speed up the decomposition reaction and allow it to proceed at the necessary rapid rate at temperatures considerably lower than those which would be required to decompose the hydrocarbon gas without contact surfaces. Moreover, a temperature which would be sufficient to decompose the run gas rapidly without contact surfaces would be so high as to be destructive of the refractories.

I may next consider the case in which the combustion is controlled to produce carbon dioxide or principally carbon dioxide in the gases of combustion as they are discharged from the top of the checkerwork which is being heated by the blast. The air-gas ratio of the heating blast is adjusted to burn all of the fuel gas to carbon dioxide and all of its hydrogen to steam. For a natural gas consisting of about 91% methane, 6.5% nitrogen and 2.5% ethane, such as that from the "dry" section of the Monroe gas field in Louisiana, the ratio is approximately nine parts of air to one of natural gas. This ratio has also been found by tests to be the best ratio to use in practice. This ratio gives the highest possible temperature and is therefore the most economical for heating purposes.

It has commonly been supposed that carbon dioxide at high temperatures would act energetically as an oxidizing gas and would react with the hydrocarbon gas and the entrained carbon particles so as to cut down the yield of recoverable carbon black. I have found, however, that while the carbon dioxide at high temperatures acts as an oxidizing gas to highly heated carbon, its oxidizing action is so controlled in my method and apparatus that the recoverable yield of carbon black is not materially diminished over what it would be when using carbon monoxide or other inert gas. I believe the reason for this is as follows:

When the run gas comes in contact with the heated checkerwork, the molecules of methane or other hydrocarbon are decomposed, yielding carbon and hydrogen. Some of the carbon apparently remains in contact with the surface of the checkerwork and is immediately oxidized to carbon monoxide by the carbon dioxide or steam in the diluent gas.

The high temperatures of the surfaces and the apparent catalytic action of a surface, are apparently responsible for the rapid reaction and the oxidation of the carbon which would otherwise be encrusted on the checkerwork. I have found that in using the diluent gas containing a considerable amount of carbon dioxide, very little if any carbon is left on the checkerwork.

When the hydrocarbon is decomposed, a part of the carbon is apparently swept away from the contact surfaces as soon as it is formed and goes out into the stream of gas out of contact with the surfaces. The atoms of the free carbon apparently coalesce in considerable numbers to form the solid carbon particles. These particles constitute the recoverable carbon.

I have made the following observations in using my furnace when the heating blast was adjusted to produce carbon dioxide. The yield of carbon recovered in the carbon-collecting apparatus was substantially the same as when the heating blast was adjusted to produce principally carbon monoxide. The effluent gas which came from the retort, in addition to containing the entrained carbon, contained about 25% hydrogen, when a dilution ratio of three parts of combustion gas to one part of run gas was maintained.

The amount of undecomposed hydrocarbon in the effluent gas was much lower than that in the effluent gas from the Brownlee and Uhlinger process or in the effluent gas when using carbon monoxide in my furnace. The undecomposed hydrocarbon was only about 1 or 2% by volume of the total effluent gas. The oxides of carbon in the effluent gas existed practically entirely in the carbon monoxide form. The carbon dioxide in the effluent gas was reduced to a mere trace, if any. No appreciable amount of carbon was encrusted upon the checkerwork of the reaction zone.

From these observations, I make the following deductions: The decomposition of the hydrocarbon, such as methane, takes place principally in contact with the heat exchanging surfaces. When the methane is broken down, it yields carbon and hydrogen. The hydrogen apparently is not materially affected by the carbon dioxide and steam of the diluent gas, since there is about 25% hydrogen in the effluent gas. The carbon which is produced by the decomposition of the methane molecules suffers either one of two fates. Some of the carbon remains on the heat exchanging surfaces and is there oxidized to carbon monoxide. Some of the carbon is swept away from the surfaces before it can be thus oxidized and out into the stream of gas. Such carbon appears in the main not to be oxidized by either the carbon dioxide or steam. In the first place, this carbon is away from the surfaces and not subjected to the catalytic surface reaction. In the second place, the reaction between the solid carbon and carbon dioxide or between the solid carbon and steam is endothermic, so that if a reaction should start between a carbon particle and the carbon dioxide or the steam out in the gas, such particles would be immediately cooled and the reaction would be retarded or stopped, which would permit the carbon particles to be swept out of the reaction zone unoxidized. Moreover, as the stream of gas goes down through the reaction zone checkerwork, the proportion of carbon dioxide decreases and that of the monoxide increases until at the bottom of the checkerwork, there is no carbon dioxide present.

The rate of reaction is greater between the carbon dioxide and the carbon on the heat exchanging surfaces than it is between the carbon dioxide and the carbon entrained in the gas. Therefore, the demand for the carbon by the carbon dioxide is principally, if not entirely, satisfied by the carbon which would otherwise be deposited on the checkerwork. The same is apparently true for the steam, the steam exercising a selective oxidation, taking the carbon in contact with the checkerwork rather than the carbon entrained in the gas. As above pointed out, the reactions between carbon and carbon dioxide and between carbon and steam are endothermic. Such reactions tend to decrease in rapidity and can be kept up only by the supply of external heat. In the gas, such heat can be supplied only by radiation or convection, and such supply is slight compared with that which could be supplied from a hot contact surface. Hence, the persistence of the solid carbon particles entrained in gas. On the other hand, the heat exchanging surfaces can furnish a supply of heat which keeps up the reactions on their surfaces. Moreover, any combustion reaction takes place better at a surface than out in the gaseous phase. Hence, the carbon which would be otherwise encrusted is burned.

Using dilution ratios of about three or four parts of the combustion gas to one part of the run gas, the carbon dioxide and steam do not seem to reduce the yield of recoverable carbon below that obtainable in using an inert diluent gas. The dilution ratio should not be increased too much, however, since a too great predominance of the carbon dioxide and steam would tend to cut down the yield of recoverable carbon. Therefore, in using a diluent gas containing some potential oxidizing constituent, such as carbon dioxide or steam, the dilution ratio should be adjusted so as not to objectionably burn up the entrained carbon and reduce the yield. As above pointed out, in using a dilution ratio of about three parts of combustion gas to one part of run gas, the carbon dioxide is substantially all reduced by the carbon encrusted on the checkerwork so that it emerges from the bottom of the checkerwork as carbon monoxide. If the dilution ratio were increased too much, it is obvious that there would be too much carbon dioxide to be thus reduced, and the stream of effluent gas leaving the checkerwork would contain large amounts or a predominance of the carbon dioxide, and this might result in considerably decreasing the yield of carbon black. As above stated, I prefer to use a dilution ratio of not over about six volumes of diluent gas to one volume of run gas.

The heat exchanging surfaces are peculiarly desirable when combustion gases containing large amounts of carbon dioxide are utilized as the diluent gas. If no extensive contact surfaces were present to speed up the decomposing reaction, the mixture would have to be heated to a very high temperature to decompose the run gas at any substantial speed, and at such very high temperature the carbon particles entrained in the gas would be attacked by the carbon dioxide. On the other hand, the hot contact surfaces speed up the decomposing reaction so that the temperature of the gases may be maintained low enough not to allow the oxidation and destruction by the carbon dioxide of the carbon black particles which are entrained in the gas and which it is desired to recover as the useful product of the process. Because of the temperature balance thus obtained, the oxidizing effect of the carbon dioxide is confined principally if not entirely to the carbon which would be otherwise encrusted on the contact surfaces, and therefore not usefully recoverable.

What has just been said about the desirability of the heat exchanging surfaces in using combustion gases containing large amounts of carbon dioxide applies also to combustion gases containing steam. The very high temperatures which would be required to decompose the run gas without the aid of contact surfaces would likewise result in the oxidation and destruction of the entrained carbon black particles by the steam. The contact surfaces by speeding up the decomposing reaction allow the gases containing the steam to be maintained at a temperature insufficient to result in any considerable oxidation and destruction of the carbon black particles which are entrained in the gas. As in the case of carbon dioxide, the temperature balance thus obtained confines the oxidizing effect of the steam principally, if not entirely, to the carbon which would be otherwise encrusted on the heat exchanging surfaces.

In using a hydrocarbon for a fuel under conditions which produce carbon dioxide, steam is also produced, so that the combined undesirable effects of the carbon dioxide and the steam on the entrained carbon particles are minimized or prevented by the use of contact surfaces.

In case a fuel consisting entirely or principally of carbon, such as coke, is used, the carbon dioxide would be produced to the practical exclusion of steam. On the other hand, if a fuel, such as the waste effluent hydrogen-containing gases resulting from the Brownlee and Uhlinger, or the Spear and Moore process, should be utilized as a constituent of the heating blast, then the steam might be predominant over the carbon dioxide or monoxide.

It will be seen, therefore, that the gases of combustion may contain both carbon dioxide and steam; or carbon monoxide and steam; or carbon dioxide, carbon monoxide and steam; in varying proportions or even containing one to the practical exclusion of the other.

The yield of recoverable carbon is approximately the same, whether the blast be adjusted to produce principally carbon monoxide or carbon dioxide. When carbon monoxide is used, more of the hydrocarbon, such as methane, passes into the effluent gas undecomposed. The undecomposed hydrocarbon may amount to 5 to 6% of the volume of the effluent gas. It therefore seems that any oxidizing action by the carbon dioxide on the entrained carbon particles is fully compensated for by the increased decomposition of the methane.

The ratio of the fuel gas to the air may be adjusted so as to produce principally carbon monoxide or principally carbon dioxide or varying mixtures, although I prefer to adjust the air and fuel gas ratio so as to produce principally carbon dioxide as a higher temperature is thus given to the diluent gases as they flow over the top of the baffle wall 14 and mingle with the run gas. This tends to keep up the heat at the top of the reaction zone. To get a good yield of carbon black in the furnace, the heat distribution in the furnace is important, and I have found that the heat distribution obtained by running the furnace with principally carbon dioxide keeps up the heat at the top of the checkerwork in the reaction zone and gives a maximum production of carbon. Moreover, in using the dioxide, there is very little if any carbon black deposited on the checkerwork which would serve as a heat-insulating layer and thus reduce the efficiency of the checkerwork.

While the present process has been described with particular reference to the decomposition of natural gas, it may be applied to the decomposition of other carbon containing gases, such for example, as still gas from the petroleum refining industry, casing head gas, a gasified or vaporized oil, gases made from coal, etc. While it is preferred, because of convenience and because of the present low cost, to use the natural gas as a fuel gas, other fuels may be employed to produce part or all of the diluent products of combustion, such as oil, coke or coal, or even the waste hydrogen-containing effluent gas resulting from the Brownlee and Uhlinger or from the Spear and Moore process, which may be burned with a controlled air supply so as to produce gaseous decomposition products of the desired composition.

As will be apparent from the above description, the hot products of combustion flowing from the checkerwork chamber to which the heating blast is applied to the checkerwork chamber in which the decomposing reaction is taking place, will furnish a considerable part, if not the major part, of the heat necessary to maintain the endothermic decomposition of the run gas. The relative amounts of heat supplied by storage in the checkerwork from the previous heating blast and of heat supplied by the sensible heat of the diluent combustion gases may be varied. If the temperature of the combustion gases is relatively low, or the dilution ratio of diluent gas to run gas is low, then the heat stored in the checkerwork may be relied upon as the principal source of heat for carrying out the decomposing reaction. On the other hand, if the combustion gases are produced at a relatively high temperature and if the ratio of the diluent combustion gas to the run gas is also relatively large, the sensible heat of the combustion gas may be made the major source of heat required for the decomposing reaction.

While I have specifically illustrated and described the preferred embodiment of my apparatus and process, it is to be understood that the invention is not so limited, but may be otherwise embodied and practiced within the scope of the following claims.

I claim:—

1. The process of producing carbon black, which comprises burning a fuel to produce hot combustion gases, forming a mixture containing the hot combustion gases and a hydrocarbon gas to be decomposed, passing the mixture over extensive heat exchanging surfaces so as to decompose the hydrocarbon gas and yield solid carbon particles, and separating the carbon particles from the gaseous decomposition products.

2. The process of producing carbon black, which comprises burning a fuel with air so as to produce hot combustion gases, consisting principally of nitrogen, water vapor and an oxide of carbon, forming a mixture containing the hot combustion gases and a hydrocarbon gas to be decomposed, passing the mixture over extensive heat exchanging surfaces so as to decompose the hydrocarbon gas and yield solid carbon particles, and separating the carbon particles from the gaseous decomposition products.

3. The process of producing carbon black, which comprises burning a fuel with air so as to produce hot combustion gases, consisting principally of nitrogen, water vapor and carbon dioxide, forming a mixture containing the hot combustion gases and a hydrocarbon gas to be decomposed, passing the mixture over extensive heat exchanging surfaces so as to decompose the hydrocarbon gas and yield solid carbon particles, and separating the carbon particles from the gaseous decomposition products.

4. The process of producing carbon black by thermal decomposition, which comprises burning a fuel to produce hot combustion gases, forming a mixture containing the hot combustion gases and a hydrocarbon gas to be decomposed, further heating the mixture by contact with heat exchanging surfaces so as to decompose the hydrocarbon gas and yield solid carbon particles, and separating the carbon particles from the gaseous decomposition products.

5. The process of producing carbon black, which comprises burning a fuel to produce hot combustion gases, mixing at least two volumes of the hot combustion gases with one volume of a hydrocarbon gas to be decomposed, volumes being computed at the same temperature, passing the mixture over extensive heat exchanging surfaces so as to decompose the hydrocarbon gas and yield solid carbon particles, and separating the carbon particles from the gaseous decomposition products.

6. The process of producing carbon black, which comprises burning a fuel with air so as to produce hot combustion gases consisting principally of nitrogen, water vapor and carbon dioxide, mixing at least two volumes of the hot combustion gases with one volume of a hydrocarbon gas to be decomposed, volumes being computed at the same temperature, passing the mixture over highly heated checkerwork so as to decompose the hydrocarbon gas and yield solid carbon particles, and separating the carbon particles from the gaseous decomposition products.

7. The process of producing carbon black, which comprises burning a fuel to produce hot combustion gases, mixing at least two volumes of the hot combustion gases with one volume of a hydrocarbon gas to be decomposed, volumes being computed at the same temperature, further heating the mixture so as to decompose the hydrocarbon gas and yield solid carbon particles, and separating the carbon particles from the gaseous decomposition products.

8. The process of producing carbon black, which comprises burning a fuel to produce hot combustion gases, mixing from two to six volumes of the hot combustion gases with one volume of the hydrocarbon gas to be decomposed, volumes being computed at the same temperature, passing the mixture over extensive heat exchanging surfaces so as to decompose the hydrocarbon gas and yield solid carbon particles, and separating the carbon particles from the gaseous decomposition products.

9. The process of producing carbon black, which comprises burning a fuel to produce hot combustion gases, mixing from two to six volumes of the hot combustion gases with one volume of a hydrocarbon gas to be decomposed, volumes being computed at the same temperature, further heating the mixture so as to decompose the hydrocarbon gas and yield solid carbon particles, and separating the carbon particles from the gaseous decomposition products.

10. The process of producing carbon black, which comprises burning a fuel to produce hot combustion gases, forming a mixture containing the hot combustion gases and a hydrocarbon gas to be decomposed, and passing the mixture through highly heated checkerwork so as to decome the hydrocarbon gas and yield solid carbon particles, separating the carbon particles from the gaseous decomposition products, and periodically applying a heating blast to the checkerwork.

11. The process of producing carbon black, which comprises burning a fuel to produce hot combustion gases, forming a mixture containing the hot combustion gases and a hydrocarbon gas to be decomposed, passing the mixture over extensive heat exchanging surfaces so as to decompose the hydrocarbon gas and yield solid carbon particles, separating the carbon particles from the gaseous decomposition products, and periodically applying a heating blast to the contact surfaces.

12. The process of producing carbon black, which comprises burning a fuel to produce hot combustion gases, mixing the hot combustion gases with a hydrocarbon gas to be decomposed, passing the mixture over extensive heat exchanging surfaces so as to decompose the hydrocarbon gas and yield solid carbon particles, the temperature of the hot combustion gases and the dilution ratio between them and the hydrocarbon gas being such that the considerable portion of the heat required for the decomposition of the hydrocarbon gas is supplied from the sensible heat of the hot diluent combustion gases, and separating the carbon particles from the gaseous decomposition products.

13. The process of producing carbon black, which comprises burning a fuel with air and passing the gases of combustion over contact surfaces and thereby imparting heat thereto, forming a mixture containing the hot combustion gases and a hydrocarbon gas to be decomposed and passing the hot mixture thus formed over a second set of previously heated contact surfaces so as to decompose the hydrocarbon gas and yield solid carbon particles, and separating the carbon particles from the gaseous decomposition products, and reversing the operation by burning a fuel with air and passing the gases of combustion over the second set of contact surfaces, forming a mixture containing the hot combustion gases and the hydrocarbon gas to be decomposed, and passing the hot mixture thus formed over the previously heated first set of contact surfaces so as to decompose the hydrocarbon gas and yield solid carbon particles, and separating the carbon particles from the gaseous decomposition products.

14. The process of producing carbon black, which comprises burning a fuel to produce an oxidizing blast and passing such blast through checkerwork to impart heat thereto and burn off any carbon which may remain from the previous cycle of operation, mixing a hydrocarbon gas to be decomposed with the hot gaseous products of combustion from such blast, passing the mixture through a previously heated second set of checkerwork so as to decompose the hydrocarbon gas and yield carbon particles, separating the carbon particles from the gaseous decomposition products, and reversing the operation by supplying the oxidizing heating blast to the second set of checkerwork, and passing the gaseous products of combustion together with the hydrocarbon gas to be decomposed through the first set of checkerwork.

15. Apparatus for the production of carbon black, comprising two chambers containing extensive contact surfaces adapted to be heated, a burner discharging into each chamber, means for conducting products of combustion from each chamber to the other chamber, means for mixing a hydrocarbon gas to be decomposed with the products of combustion passing from one chamber to the other chamber and for passing the mixture over the hot contact surfaces in the second chamber so as to decompose the hydrocarbon gas and yield solid carbon particles, means for periodically reversing the flow of gases between the chambers, and means for separating the carbon particles from the gaseous decomposition products.

16. Apparatus for the production of carbon black, comprising two chambers containing refractory checkerwork, means for passing a heating blast through the checkerwork of each chamber, means for leading the hot products of combustion from such blast from one chamber to the other, means for mixing a hydrocarbon gas to be decomposed with such hot products of combustion and passing the mixture through the heated refractory checkerwork in the other chamber so as to decompose the hydrocarbon gas and yield solid carbon particles, means for periodically reversing the flow of gases through the chambers, and means for separating the carbon particles from the gaseous decomposition products.

17. Apparatus for the production of carbon black, comprising chambers containing extensive hot contact surfaces adapted to be heated, means for supplying a heating blast to each chamber, means for conducting the products of combustion while retaining their sensible heat from one chamber to another, means for mixing a hydrocarbon gas to be decomposed with the hot products of combustion passing from one chamber to another chamber and for passing the mixture over the hot contact surfaces therein so as to decompose the hydrocarbon gas and yield solid carbon particles, and means for separating the carbon particles from the gaseous decomposition products.

18. Apparatus for the production of carbon black, comprising a chamber containing extensive hot contact surfaces adapted to be heated, means for periodically supplying a heating blast to heat the contact surfaces in such chamber, means for thereafter supplying to such chamber a mixture containing hot combustion gases and a hydrocarbon gas to be decomposed and for passing the mixture over the hot contact surfaces therein so as to decompose the hydrocarbon gas and yield solid carbon particles, and means for separating the carbon particles from the gaseous decomposition products.

19. Apparatus for the production of carbon black, comprising a chamber containing refractory checkerwork, means for applying a heating blast to heat the checkerwork in such chamber, means for passing through the heated checkerwork a mixture containing hot combustion gases and a hydrocarbon gas to be decomposed and thereby decompose the hydrocarbon gas and yield solid carbon particles, and means for separating the carbon particles from the gaseous decomposition products.

20. The process of producing carbon black, which comprises burning a fuel to produce hot combustion gases, forming a mixture containing the hot combustion gases and a hydrocarbon gas to be decomposed, passing the mixture over heated checkerwork surfaces so as to decompose the hydrocarbon gas and yield solid carbon particles, and separating the carbon particles from the gaseous decomposition products.

21. The process of producing carbon black, which comprises burning a fuel to produce hot combustion gases, mixing at least two volumes of the hot combustion gases with one volume of a hydrocarbon gas to be decomposed, volumes being computed at the same temperature, passing the mixture over heated checkerwork surfaces so as to decompose the hydrocarbon gas and yield solid carbon particles, and separating the carbon particles from the gaseous decomposition products.

In testimony whereof I have hereunto set my hand.

ELLWOOD B. SPEAR.

CERTIFICATE OF CORRECTION.

Patent No. 1,880,512.  October 4, 1932.

ELLWOOD B. SPEAR.

It is hereby certified that error appears in the printed specification of the above numbered patent requiring correction as follows: Page 4, line 28, for "checkerboard" read "checkerwork"; page 8, line 66, after the syllable "oxi-" insert the syllable and words "dized by the carbon dioxide or steam into"; page 11, line 32, claim 10, for "decome" read "decompose"; and that the said Letters Patent should be read with these corrections therein that the same may conform to the record of the case in the Patent Office.

Signed and sealed this 13th day of December, A. D. 1932.

(Seal)

M. J. Moore,
Acting Commissioner of Patents.